United States Patent [19]

Mao

[11] Patent Number: 4,769,727

[45] Date of Patent: Sep. 6, 1988

[54] SELF-LOADING MAGNETIC HEAD SLIDER

[75] Inventor: James C. Mao, Bloomington, Minn.

[73] Assignee: Magnetic Peripherals Inc., Minneapolis, Minn.

[21] Appl. No.: 898,374

[22] Filed: Aug. 20, 1986

Related U.S. Application Data

[63] Continuation of Ser. No. 542,693, Oct. 17, 1983, abandoned.

[51] Int. Cl.[4] .......................... G11B 5/60; G11B 21/21; G11B 5/54
[52] U.S. Cl. ...................................... 360/103; 360/105
[58] Field of Search ................................ 360/102–104, 360/122, 128, 129

[56] References Cited

U.S. PATENT DOCUMENTS 3,193,835  7/1965  Wadey .................................. 346/74
4,218,715  8/1980  Garnier ............................... 360/103

Primary Examiner—John H. Wolff
Assistant Examiner—Benjamin E. Urcia
Attorney, Agent, or Firm—Bill D. McCarthy

[57] ABSTRACT

An improved self-loading magnetic head slider for recording and reading data on a magnetic storage disk, is characterized by the addition of aerodynamically designed wings used for lowering the slider close to the surface of the disk to a designed head-to-disk separation as the disk is rotated. The magnetic head slider does not contact the magnetic storage disk surface.

6 Claims, 2 Drawing Sheets

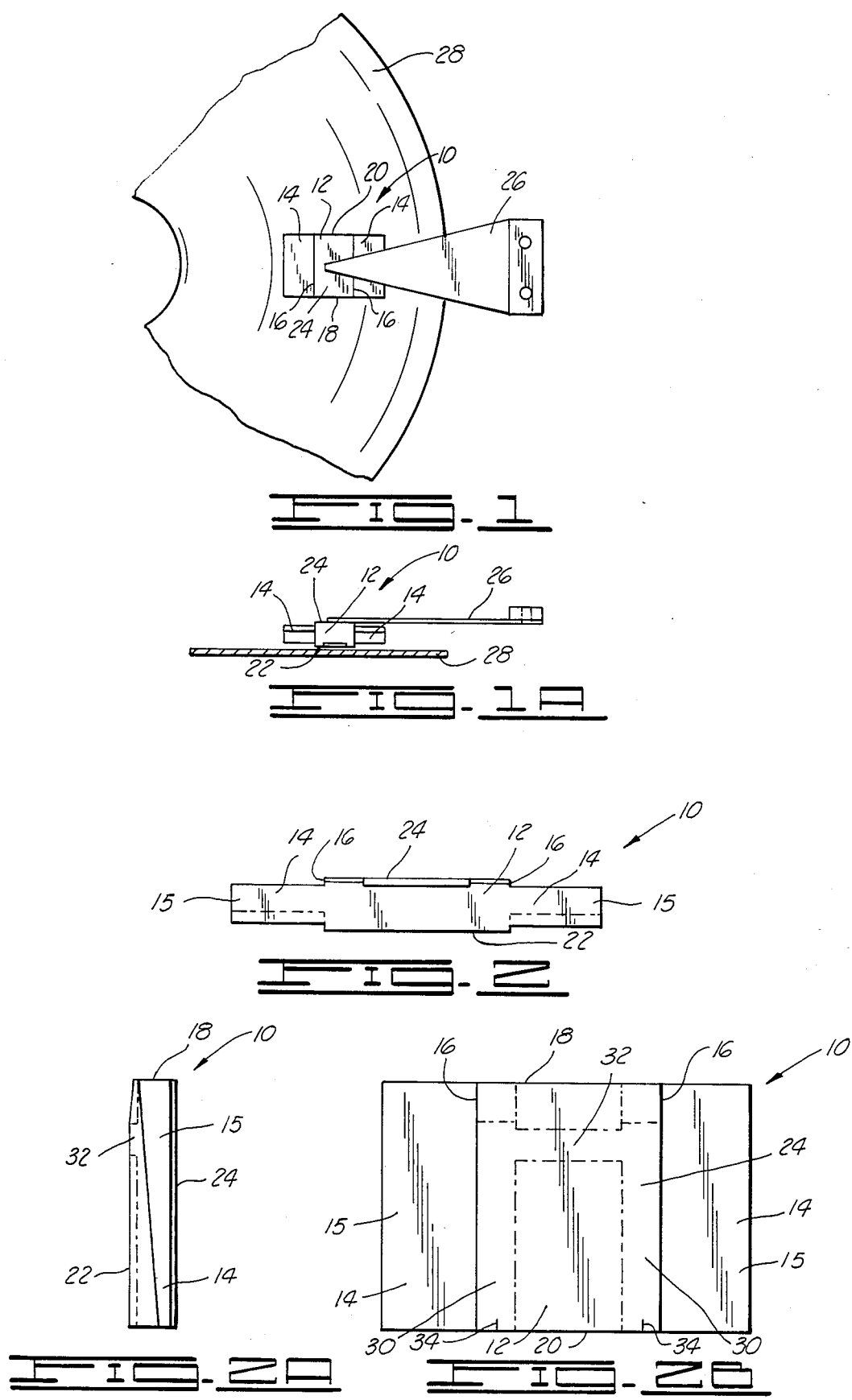

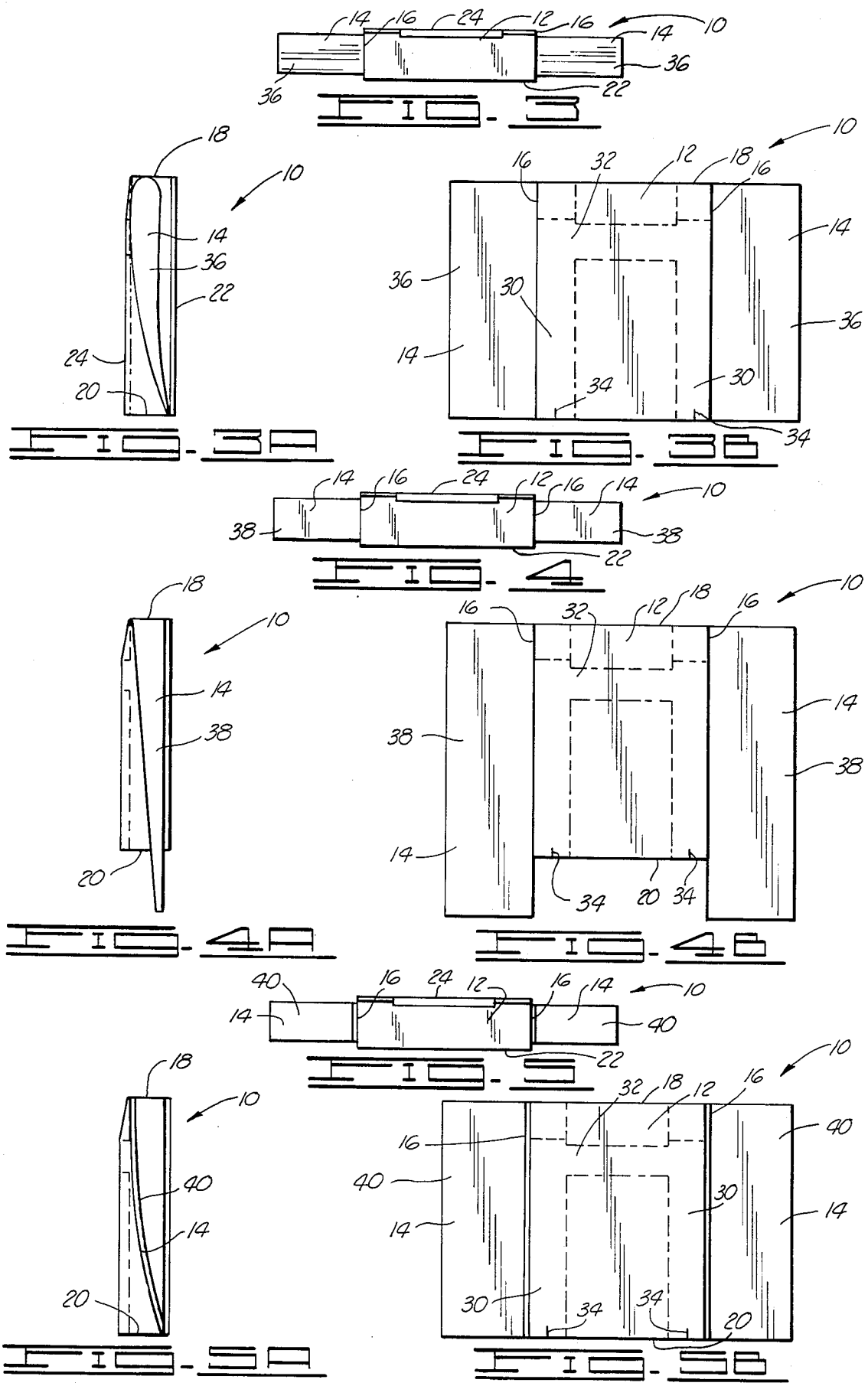

SELF-LOADING MAGNETIC HEAD SLIDER

This application is a continuation application on my invention described in a past application having Ser. No. 542,693, filed on Oct. 17, 1983 having the same title and now abandoned.

BACKGROUND OF THE INVENTION

The invention relates to a slider used for recording and reading data on a disk storage unit and more particularly, but not by way of limitation, to an improved self-loading head slider having a "H"-shaped negative pressure slider housing or other shaped negative pressure slider housing.

Heretofore, there have been various types of magnetic sliders having head supports with aerodynamic designs as described in U.S. Pat. Nos. 2,972,738 and 3,149,337 to Sliter, 3,193,835 to Wadey, 4,141,049 to Watrous and Japanese Pat. No. 53-118115 to Iida. Also a recent U.S. Pat. No. 4,218,715 to Garnier discloses an improved "H"-shaped negative pressure slider housing design. None of the prior art patents specifically disclose the advantages of combining the "H"-shaped negative pressure slider housing with the structure of aerodynamic surfaces as described herein.

SUMMARY OF THE INVENTION

The subject invention provides a combination of an "H"-shaped negative pressure slider housing with aerodynamic wings rather than designing the entire slider aerodynamically.

The self-loading magnetic head slider reduces the manufacturing cost of head sliders with improved reliability.

Through the use of aerodynamic design wings extending outwardly from the sides of the slider housing, the slider may now be drawn toward the rotating disk until it reaches an operating position riding on an air cushion only a fraction of a micron thick.

Heretofore, airfoil sliders have been very sensitive to head orientation and alignment. The combination of structure in the self-loading magnetic head slider as described reduces head orientation and alignment problems.

The improved self-loading magnetic head slider used for recording and reading data on a magnetic storage disk includes a slider housing connected to a suspension arm. The slider housing includes a read/write head thereon. Extending outwardly from the sides of the slider housing are a pair of aerodynamic surfaces such as wings which by air drag, overcome the bias force of the suspension arm and lower the slider housing to a required spacing above the disk surface as the disk is rotated. The advantages and objects of the invention will become evident from the following detailed description of the drawings when read in connection with the accompanying drawings which illustrate preferred embodiments of the invention.

BRIEF DESCRIPTION OF THE DRAWINGS

In FIG. 1 a top view of the suspension arm with improved self-loading magnetic head slider is shown received on top of a magnetic disk.

FIG. 1A is a side view of the improved slider disposed above the disk.

FIGS. 2, 2A and 2B are a front, side and top view of the improved slider with wedge shaped wings integrally formed in the side of the slider housing.

FIGS. 3A and 3B are a front, side and top view of the improved slider with airfoil shaped wings integrally formed in the side of the slider housing.

FIGS. 4, 4A and 4B are a front, side and top view of the improved slider with wedge-shaped wings attached to the side of the slider housing.

FIGS. 5, 5A and 5B are a front, side and top view of the improved slider with airfoil-shaped wings attached to the sides of the slider housing.

DETAILED DESCRIPTION OF THE DRAWINGS

In FIG. 1 the improved self-loading magnetic band slider is designated by general reference number 10. The slider 10 includes a slider housing 12 having a pair or aerodynamic surfaces such as wings 14 extending outwardly from the opposite sides 16 of the housing 12. The housing further includes a leading edge 18, a trailing edge 20, a bottom surface 22 shown in FIG. 1A and a top surface 24 which is connected to a head suspension arm 26.

The head suspension arm 26 suspends the slider 10 above the surface of a disk 28 when the disk 28 is stopped. The suspension arm 26 is rigid with the slider 10 gimbaled so the bottom surface 22 of the housing 12 flys only a few microinches above the recording surface of the disk 28. In FIG. 1A the disk 28 is shown in cross-section illustrating how the slider 10 is suspended above the disk 28 when the disk is stopped.

In FIG. 2, 2A and 2B a front, side and top view of the improved self-loading magnetic head slider 10 show the aerodynamic wings 14 integrally formed in the sides 16 of the housing 12. The wings 14 are shown in the form of a wedge shape 15. The housing 12 may be an "H" shaped negative pressure slider having longitudinal side rails 30 with a cross rail 32 and read/write heads 34 inserted in the ends of the side rails 30 and at the trailing edge 20 of the housing 12. (It should be noted that the size of the housing 12, wings 14 and the read/write heads 34 have been greatly enlarged for illustration purposes only.) As mentioned above, the "H" designed negative pressure slider is more thoroughly discussed in detail in U.S. Pat. No. 4,218,715 to Garnier.

In FIGS. 3, 3A and 3B an alternate embodiment of the improved slider 10 is shown with the wings 14 being shaped in the form of an airfoil 36. Again, the wedge shaped wings 15 shown in FIG. 2 and the airfoil shaped wings 36 shown in FIG. 3 are integrally formed into the sides 16 of the housing 12 for ease in manufacturing.

In FIG. 4, 4A and 4B a front, side and top view of an alternate embodiment of the improved slider 10 is shown with wedge shaped wings 38 attached rather than molded into sides 16 of the housing 12. Likewise in FIG. 5, 5A and 5B an airfoil shaped wing 40 is attached to the sides 16 of the housing 12.

When the rotation of the disk 28 begins, the aerodynamic surfaces of the wings 14 are affected by the air dragged along by rotation of the disk. The wings 14 act to pull the housing 12 by distorting the suspension arm 26 down to a required spacing of a few microinches from the top of the disk 28. When the disk 28 stops, the bias force of the arm 26 returns the improved slider 10 to its normal position above the surface of the disk 28.

The read/write head 34 can be a ferrite "ring type" head which is inserted at the end of the side rails 30. The read/write head can also be a thin film processed conductive, magnetic-resistive or any other kind of transducer. In the thin film head process, the transducers are deposited on a wafer with a semi-conductor type manufacturing process and then machined to individual heads. In this example, it is extremely difficult to form an integrally formed wing. Therefore, it is easier to mount the wings on the heads separately as shown in FIGS. 4, 4A, 4B, 5, 5A and 5B. For heads fabricated individually such as a head with ferrite cores, it is possible to integrally form the wings on the slider as shown in FIGS. 2, 2A, 2B, 3, 3A and 3B.

Changes may be made in the construction and arrangement of the parts or elements of the embodiments as described herein without departing from the spirit or scope of the invention defined in the following claims.

What is claimed is:

1. A self-loading magnetic head slider gimballed and attached to one end of a head suspension arm for transcribing data onto an adjacent rotating disk, the arm suspending the slider spaced from the disk surface when the disk is stopped, said arm distortable to shift the head toward the disk, the slider comprising:

an "H"-shaped negative pressure slider housing having a straight leading edge, a straight trailing edge, longitudinal side rails on opposite sides, a transverse cross rail and a top and bottom surface, the suspension arm connected to the top surface of the housing, the trailing edge of the housing receiving a read/write head thereon; and aerodynamic surfaces extending outwardly from and abutting the opposite sides of the housing, the aerodynamic surfaces having straight leading edges and straight trailing edges parallel to the straight leading and trailing edges of the slider housing, the aerodynamic surfaces by air dragged by the disk rotation past them, creating lift to distort said arm to draw the straight trailing edge of the slider housing toward the disk into a required spacing from the disk surface as the disk is rotated.

2. The slider as described in claim 1 wherein the aerodynamic surfaces define wings.

3. The slider as described in claim 2 wherein the wings are wedge shaped.

4. The slider as described in claim 2 wherein the wings are airfoil shaped.

5. The slider as described in claim 1 wherein the aerodynamic surfaces define wings integrally formed in the opposite sides of the slider housing.

6. The slider as described in claim 1 wherein the aerodynamic surfaces define wings attached to the opposite sides of the slider housing.

* * * * *

UNITED STATES PATENT AND TRADEMARK OFFICE
CERTIFICATE OF CORRECTION

PATENT NO. : 4,769,727
DATED : September 6, 1988
INVENTOR(S) : James C. Mao

It is certified that error appears in the above-identified patent and that said Letters Patent is hereby corrected as shown below:

Cover Sheet - [56] References Cited, add the following Reference Patents:

U.S. Patent Documents:

| | | | |
|---|---|---|---|
| 4,141,049 | 2/1979 | Watrous | 360/103 |
| 2,972,738 | 2/1961 | Slider | 360/103 |

Foreign Patent Documents:

| | | | |
|---|---|---|---|
| 53118115 | 10/1978 | Japan | 360/103 |
| 53118114 | 10/1978 | Japan | 360/103 |
| 57158062 | 9/1982 | Japan | 360/103 |
| 53147520 | 12/1978 | Japan | 360/103 |

Cover Sheet - [57] Abstract, line 2, the words "disk, is" should read --disk is--.

Signed and Sealed this

Thirteenth Day of June, 1989

Attest:

DONALD J. QUIGG

*Attesting Officer*     *Commissioner of Patents and Trademarks*